United States Patent [19]

Gavronsky et al.

[11] Patent Number: 4,674,268
[45] Date of Patent: Jun. 23, 1987

[54] APPARATUS AND METHOD FOR FORMING FOAM CUSHIONS FOR PACKAGING PURPOSES

[75] Inventors: German Gavronsky; Semyon Krislav, both of Stamford, Conn.

[73] Assignee: Sealed Air Corporation, Saddle Brook, N.J.

[21] Appl. No.: 781,132

[22] Filed: Sep. 26, 1985

[51] Int. Cl.⁴ .................. B65B 43/26; B65B 7/00
[52] U.S. Cl. ........................ 53/468; 53/469; 53/567; 53/570; 53/386; 141/10; 141/90
[58] Field of Search ............ 53/373, 386, 468, 469, 53/567, 570, 572; 141/10, 68, 90, 114, 313–317

[56] References Cited

U.S. PATENT DOCUMENTS

| | | | |
|---|---|---|---|
| 3,382,642 | 5/1968 | Shaw | 53/469 X |
| 3,390,617 | 7/1968 | Cloud et al. | 53/570 X |
| 3,477,196 | 11/1969 | Lerner | 53/570 X |
| 4,014,154 | 3/1977 | Lerner | 53/469 X |
| 4,057,949 | 11/1977 | Greffe | 53/434 |
| 4,350,187 | 9/1982 | Trusselle | 141/90 |
| 4,378,666 | 4/1983 | Onishi | 53/570 |
| 4,387,550 | 6/1983 | Lerner | 53/469 X |
| 4,586,318 | 5/1986 | Litt et al. | 53/570 X |

Primary Examiner—John Sipos
Assistant Examiner—Steven P. Weihrouch
Attorney, Agent, or Firm—Bell, Seltzer, Park & Gibson

[57] ABSTRACT

A method and apparatus for successively forming, opening, filling and sealing plastic bags formed from a stock supply of plastic tubing and characterized by the elimination of handling of cut bags during formation and filling. The apparatus comprises a heat seal member and anvil for forming seals across portions of flattened plastic tubing advanced from a stock supply, a cutting blade for forming a slit partially across the flattened plastic tubing and extending through both juxtaposed portions of the flattened plastic tubing to thereby produce a sleeve defined by a seal and a slit and serially attached to the stock supply of plastic tubing across the unslit portions of the plastic tubing, suction apparatus for opening the sleeve at the slit, an injection cartridge for filling the sleeve with the desired filling material and a cutting blade for severing the filled sleeve at the slit from the remainder of the stock supply of plastic tubing while simultaneously forming a second seal across the sleeve and adjacent the severed portions thereof and while simultaneously forming a next corresponding seal across the next successive portion of flattened plastic tubing advanced from the stock supply.

19 Claims, 5 Drawing Figures

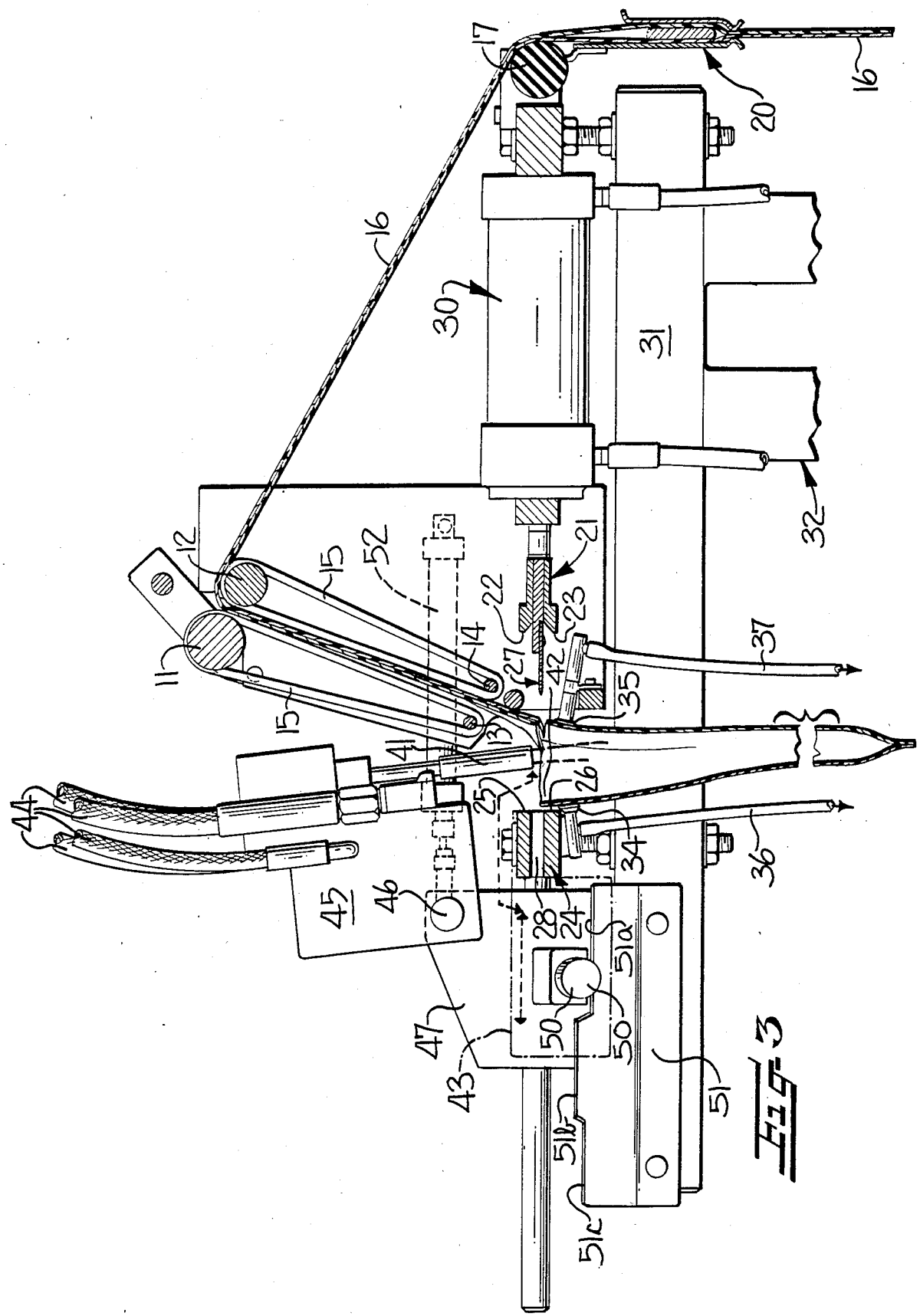

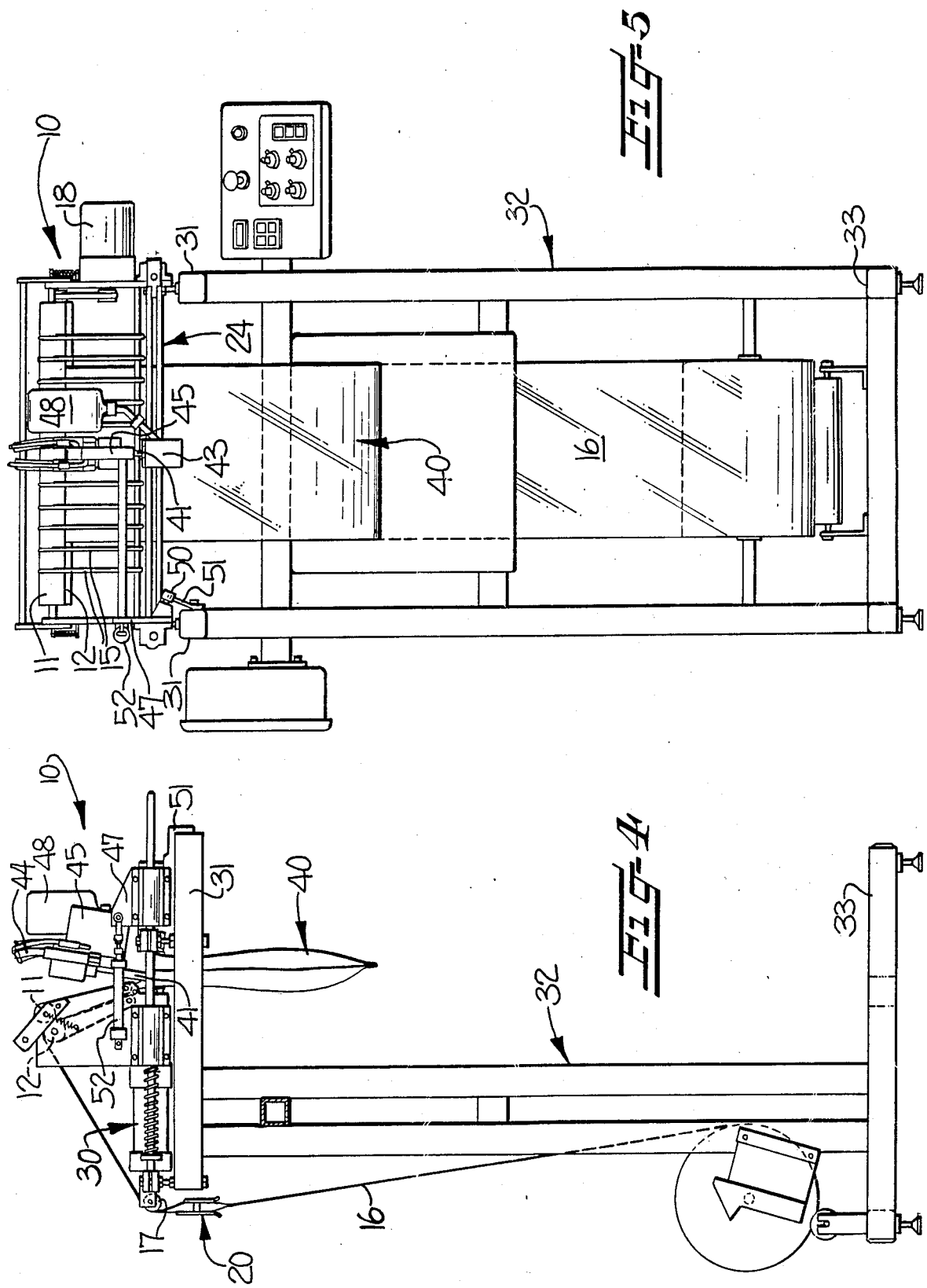

APPARATUS AND METHOD FOR FORMING FOAM CUSHIONS FOR PACKAGING PURPOSES

FIELD OF THE INVENTION

The present invention relates to the manufacture, filling and sealing of plastic bags from a stock material and is particularly directed towards the formation of foam-filled packaging cushions from a stock supply of flattened plastic tubing.

BACKGROUND OF THE INVENTION

Protecting various articles of different sizes and shapes packaged within generally square or rectangular packing cartons during handling and shipment is a common problem in the packaging industry. This problem is most commonly addressed by placing a shock absorbing cushioning material around the article or articles to cushion the articles from the shocks incident to handling and shipment.

In some circumstances, this cushioning material is a loose, friable material completely surrounding the articles, and in others, the articles are wrapped in sheets of cushioning material. Another cushioning material currently in use is foam-in-place polyurethane which is injected into the cartons and a mold forms a cavity the size and in the shape of the article being packaged. This cavity must be left open at the top to permit the placement therein of the article. Several ways of closing the top of this cavity and protecting the top of the article have been used. One such way has been to form a cavity closing member on one or more of the carton closure flaps of foam-in-place polyurethane. Another has been to form a separate closure member of cushioning material which is placed in the cavity above the item before closing the top of the package. A particular type of such separately formed closure member is formed by filling a pre-formed bag, generally formed of plastic, with a cushioning material (usually foam-in-place polyurethane) and then closing the top of the bag to form a pillow-like cushion which is then placed above the article packaged inside a container. Although such cushions can provide the desired protection, the fabrication thereof has heretofore been a strictly manual operation because no suitable automated means exist for either filling or for making and then filling plastic bags with cushioning materials to form cushion-type pillows. Such manual operations are cumbersome, time-consuming, expensive and result in non-uniform and sometimes inadequate cushioning members.

Machines for making plastic bags have, of course, been available for some time. Such machines have included those which transfer bag materials to different stations for forming the bags, filling the bags, sealing the bags and then delivering the bags; machines for opening and loading of pre-formed bags; machines for forming bags from folded over plastic; machines for drawing bagging material upwardly so that relatively heavy, solid objects can be dropped therein to form the bag; machines for filling and separating previously formed bags from a stock supply; and some machines that form and fill plastic bags from plastic tubing from a stock supply.

All of these machines suffer certain disadvantages which prevent their effective use to form packaging cushions. In particular, because one preferred cushioning material is plastic foam, generally formed from foam precursors which react in situ, any machine suitable for forming such cushions must be suitable for handling foam precursors and filling formed bags with such precursors. Thus, machines which form bags by loading with heavy solid objects, or by allowing solid materials to be dropped therein, or which by their structure can only load solid objects into the bags, are generally not suitable for the handling of foam precursors.

Additionally, because various packaging applications require that many different sized objects be packed in many different sized containers, bagging machines which can only form, fill and close bags of a single size are generally not useful for forming packaging cushions. Consequently, existing machines for handling serially attached bags from a stock supply of bag material, for forming and filling one particular size of bag from stock plastic material, or for shaping particular bags around particular objects, are unsuitable for the many packaging applications for which foam-filled cushions are necessary.

Finally, because foam precursors generate gases during the foam formation process, any process for producing packaging cushions made from plastic bags and foam precursors must deal with the gases produced. Specifically, machines or processes which form totally sealed bags are unsuitable because they provide no method for the off-gases to escape unless the bags formed and filled with foam are kept open for a significant period of time prior to sealing, an alternative which would greatly slow production process.

It is thus an object of the present invention to provide a method and apparatus for forming foam cushions for packaging purposes which comprise plastic bags substantially sealed at both ends and enclosing a plastic foam.

It is a further object of this invention to provide a packaging cushion from which gases generated as the foam precursors form foam can escape while the foam is retained therein.

It is another object of this invention to provide a method and apparatus for forming, opening, filling and sealing plastic bags formed from a stock supply of plastic tubing characterized by the elimination of handling of cut bags during formation and filling and which eliminates the problem of the off-gases generated during foam formation.

It is a further object of this invention to provide an apparatus for forming foam cushions of a variety of sizes which makes most efficient use of foam and which can be quickly and easily adjusted to form different sizes as may be so desired.

SUMMARY OF THE INVENTION

The invention provides a method and apparatus for forming a foam cushion for packaging purposes comprising opening a previously partially formed plastic bag serially attached to a stock supply of plastic bag material, directing a predetermined amount of foam precursors into the partially formed bag and completing the formation of the bag by sealing the partially formed bag adjacent the opening while removing the bag from the stock supply of bag material.

The invention also provides a method and apparatus for forming a foam cushion for packaging purposes by advancing a length of flattened plastic tubing along a predetermined path of travel, the leading end of said tubing having been previously sealed with a first seal to close the leading end, cutting a transverse slit in a portion of both layers of the flattened plastic tubing spaced from the closed leading end while leaving the remainder of the tubing uncut, moving the juxtaposed portions of the advanced flattened tubing adjacent the slit away from each other to provide an access opening into the portion of the tubing between the slit and the closed leading end and thereby forming an open bag defined by the access opening and the sealed leading end and serially attached to the remainder of the flattened plastic tubing, injecting foam precursors by directing a foamable composition through the access opening into the bag between the slit and the closed end, sealing the bag adjacent the slit with a second seal to thereby close the formed and filled plastic bag and severing the flattened tubing at the slit to separate the formed and filled bag from the plastic tubing.

The invention also provides a method and apparatus for forming, opening, filling and sealing plastic bags formed from a stock supply of plastic tubing characterized by the elimination of handling of cut bags during formation and filling, which method comprises; forming a first seal across a portion of flattened plastic tubing advanced from a stock supply, forming a transverse slit through both layers of the flattened plastic tubing above and substantially parallel thereto the first seal thereby producing a sleeve defined by the first seal and by the slit and serially attached to the stock supply of plastic tubing across the unslit portions of the plastic tubing, opening the sleeve at the slit, filling the sleeve with the desired filling material, severing the filled sleeve at the slit from the remainder of the stock supply of plastic tubing and forming a second seal across the sleeve and adjacent the severed portions thereof thereby forming a completed, filled bag defined by the first and second seals.

The invention further comprises a packaging cushion characterized by simple structure, an efficient use of foam and resistance to stress during cushioning, said cushion comprising a tubular plastic body, a continuous seal across one end of the tubular plastic body, an intermittent seal across the other end of said tubular plastic body and a foam filling occupying substantially all of said tubular plastic body.

BRIEF DESCRIPTION OF THE DRAWINGS

The foregoing and other objects, advantages and features of the invention, and the manner in which the same are accomplished will be more readily apparent upon consideration of the following detailed description of the invention taken in conjunction with the accompanying drawings, which illustrate preferred and exemplary embodiments, and wherein:

FIG. 3 is a sectional view taken substantially along line 3—3 of FIG. 2;

FIG. 4 is an elevational view of the left side of the entire apparatus; and

FIG. 5 is a front elevational view of the entire apparatus.

DETAILED DESCRIPTION

Figure 1:
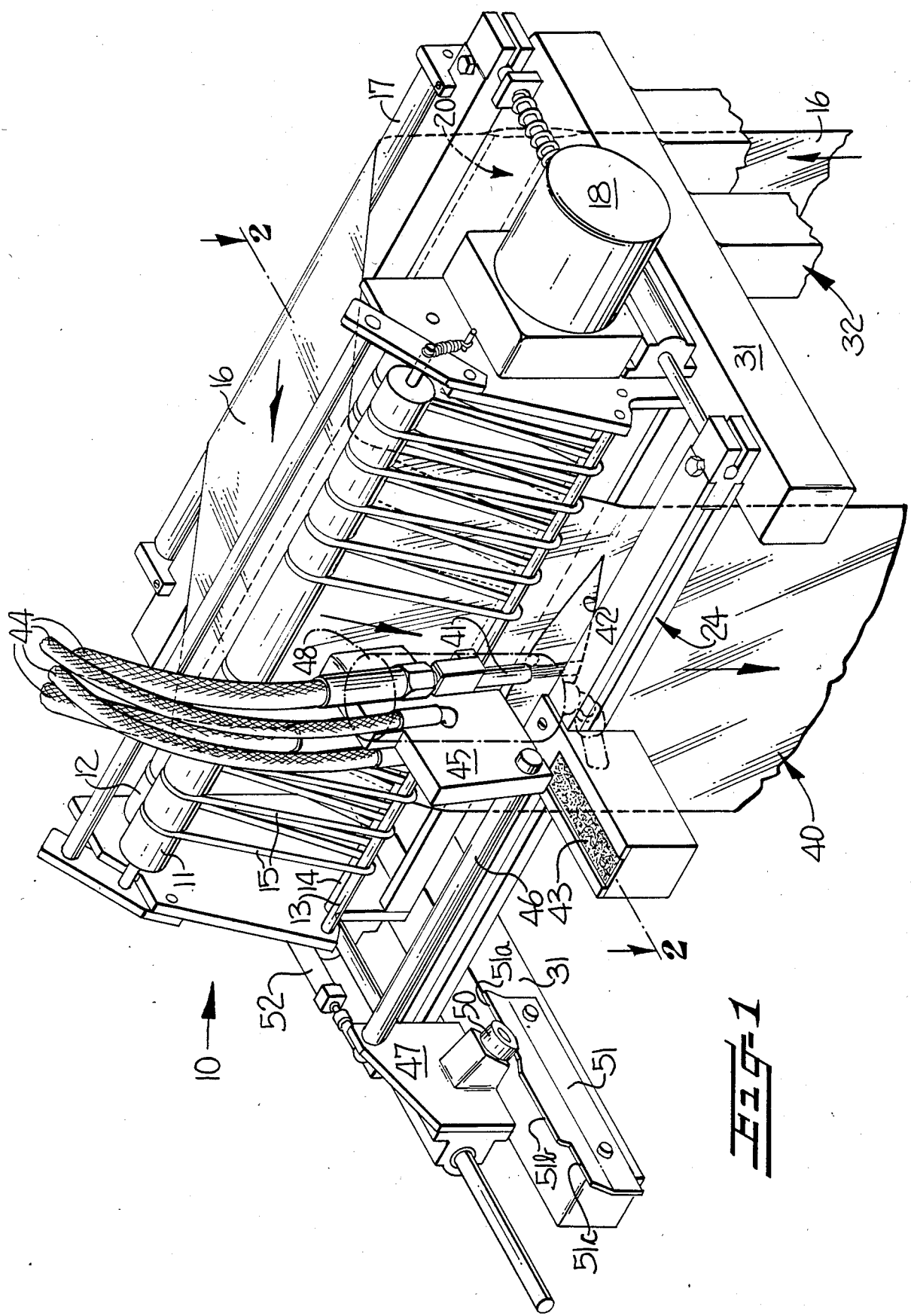
FIG. 1 is a perspective view of the front and right side of the apparatus of the invention.

The method of the present invention will be most clearly recognized by reference to the apparatus to be described herein. FIG. 1 is a front perspective view of upper portions of the apparatus which is broadly designated at 10. In the embodiment illustrated, the apparatus comprises means for advancing a predetermined incremental length of flattened plastic tubing from a stock supply along a predetermined path of travel. In the embodiment shown in the drawings, the advancement means include a pair of upper advancement rollers 11 and 12 and a pair of lower rollers 13 and 14 with advancement belts 15 carried by the respective sets of pairs of rollers. As illustrated in FIG. 1, flattened plastic tubing designated at 16, when fed between the upper advancement rollers 11 and 12, the lower rollers 13 and 14 and the advancement belts 15, is drawn upwardly from a stock supply to the advancement rollers and then downwardly towards the position at which the foam cushions are formed and filled. A typical stock supply could include a roll of flattened plastic tubing which can easily be positioned on the apparatus below or behind the principal working positions, but which for purposes of more clearly illustrating the principal portions has been shown. A motor 18 drives the rollers and belts.

FIG. 3 illustrates some of these same features and also shows a rear deflection roller 17 and a spreading element 20 which helps prepare the flattened plastic tubing for opening and filling.

The invention further comprises means for sealing a leading end of a first successive portion of the flattened plastic tubing 16 advanced from the stock supply. In the illustrated embodiment of the invention, the means further comprise a heat seal member 21 positioned on one side of the bag advancement path and perpendicularly moveable with respect to the path between respective retracted and sealing positions. FIG. 3 shows the heat seal member 21 in its retracted position. Heat seal member 21 has an upper sealing edge 22 and a lower sealing edge 23. The upper sealing edge seals the leading end of a successive portion of flattened plastic tubing 16 and the lower sealing edge 23 seals the formed and filled bags adjacent the slit cut therein. An anvil 24 is positioned on the other side of the advancement path and in opposing relation to the heat seal member 21 at the sealing position and also has respective upper and lower portions 25 and 26 for respectively receiving the upper sealing edge 22 and the lower sealing edge 23 of the heat seal member 21.

In a preferred embodiment of the invention, the anvil 24 is formed of a somewhat resilient material in order to accomplish a more complete engagement of the upper and lower sealing edges 22 and 23 with the anvil thereby providing more complete seals across the tubing 16 and across formed and filled bags. In a particular embodiment of the invention, the lower portion 26 of the anvil 24 comprises an interrupted surface for receiving the lower sealing edge 23 of the heat seal member 21 thereagainst. The resulting seal comprises an interrupted series of sealed and non-sealed portions so that gases generated during the formation of foam from foam precursors can easily escape from the resulting cushion without causing handling or packaging problems during use.

Additionally, because the apparatus of the present invention provides such an interrupted seal, a resulting cushion is produced which has a tubular plastic body, a continuous seal across one end of the tubular plastic body, an interrupted seal across the other end of the tubular plastic body and a foam filling occupying substantially all of the tubular plastic body. The interrupted seal in the resulting cushion, in addition to allowing gases generated during foam formation to escape, also allows the cushion to "breathe" while in use; i.e. to be compressed or expanded without losing its integrity. Absent the interrupted seals, any more than minimal compression of the cushion would break it from the overly high localized exertion of gas pressure inside. Having the interrupted seals, the cushion can tolerate a much greater compression, making the cushion that much more appropriate for packaging purposes.

The invention further provides means for cutting a transverse slit through only a medial portion of both layers of the tubing at a location spaced the incremental length from the sealed leading end of the tubing while leaving uncut portions adjacent the side edges. By providing a slit through both layers of the flattened tubing while leaving a remainder uncut, the apparatus produces an unopened sleeve defined by the sealed leading edge and the slit. The sleeve remains serially attached to the stock supply of plastic tubing across the web formed by the remaining unslit portions. By using a web of the stock material itself to support the sleeve, the method and apparatus eliminate handling of cut bags during formation and filling.

Figure 2:
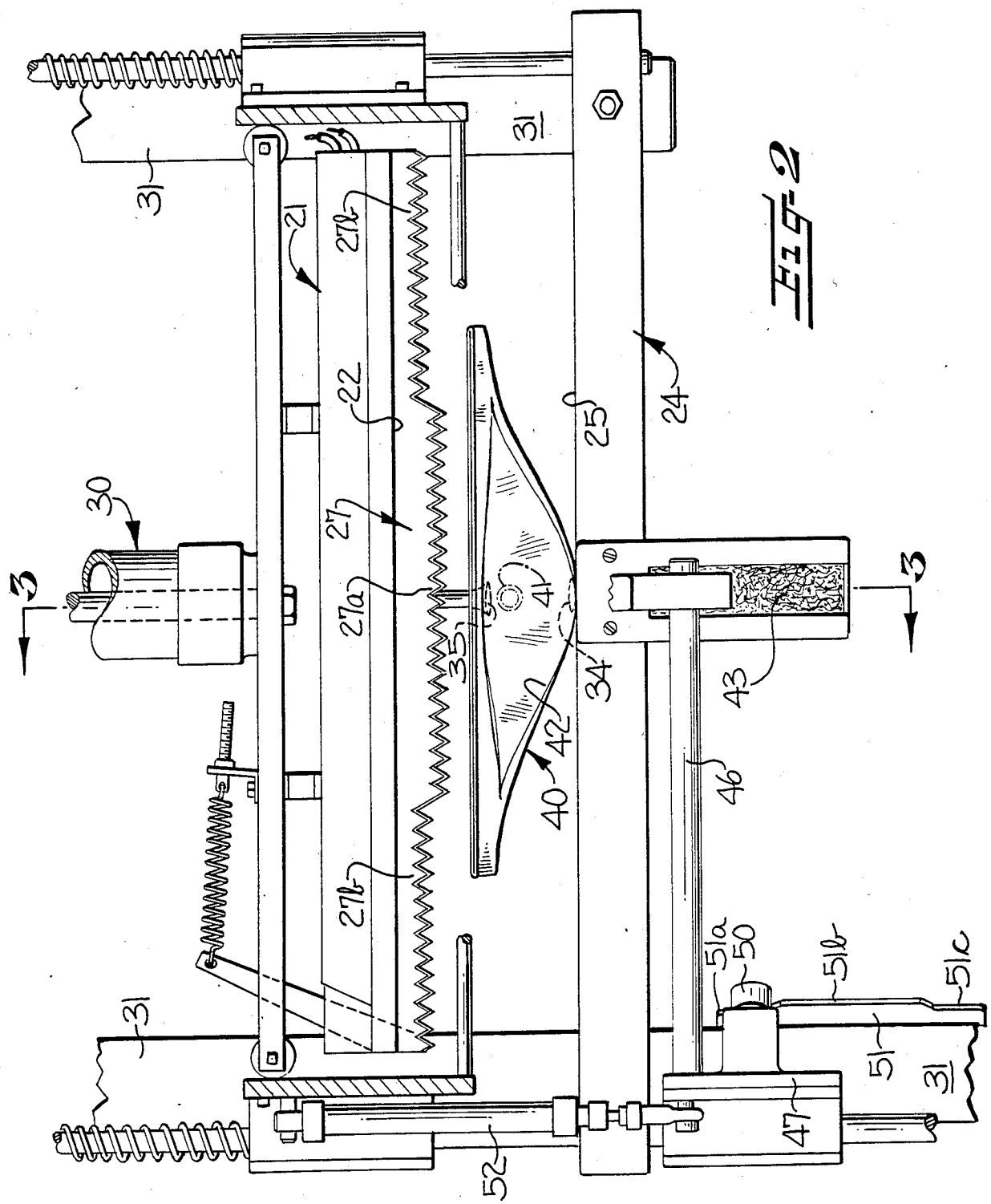
FIG. 2 is a sectional plan view taken substantially along line 2—2 of FIG. 1.

In the preferred embodiment of the invention and as best illustrated in FIG. 2, the means comprises a cutting blade 27 positioned adjacent the path of travel and generally perpendicularly thereto and having a total width greater than the width of the flattened tubing 16 to be cut. The blade 27 is moveable between the retracted position illustrated in FIG. 2, a slitting position and a severing position. The blade 27 includes a forwardly extending center portion 27a adjacent the centermost portions of the path and which has a width less than the width of the flattened plastic tubing 16 to be slit. As an integral part of the cutting blade, the forwardly extending center portion 27a is moveable from the retracted position into and across the path to the slitting position for cutting a transverse slit in both sides of the flattened plastic tubing while leaving remaining portions uncut. The remainder of the blade 27 comprises lateral severing portions designated at 27b which extend along and define opposite sides of the blade 27 from the center portion 27a and which are moveable into, through and across the advancement path to the severing position for completely severing a formed bag from the remainder of the flattened plastic tubing 16.

As illustrated in the drawings and particularly in FIGS. 2 and 3, a first reciprocal piston mechanism broadly designated at 30 drives and retracts both the heat seal member 21 and the cutting blade 27 to the respective sealing, slitting and severing positions of each, while a second reciprocal piston 52 likewise drives and retracts the carriage 47 according to a cooperation of elements to be described later herein. The piston mechanisms are supported on an upper horizontal frame 31 which in the illustrated embodiment carries several of the operative parts, and which in turn is carried on a vertical frame broadly designated at 32 which in turn rests on the lower horizontal frame 33. It will be understood that the particular arrangement for placing and supporting the apparatus of the present invention is not critical to the invention and is not limiting upon the specification or the claims.

In operation, once a leading end of the flattened plastic tubing 16 has been sealed and advanced a predetermined distance along the predetermined path of travel, and after the blade 27 has cut a transverse slit in the juxtaposed layers of the tubing 16, the invention further provides means for moving the juxtaposed layers of the flattened tubing 16 away from each other at the slit. This provides an access opening into the portion of the tubing between the slit and the closed leading end, thus forming an open bag broadly designated at 40 and defined by the access opening and the sealed leading end and serially attached to the remainder of the flattened plastic tubing.

In the embodiment of the invention illustrated in FIG. 3, the means for moving the juxtaposed layers of the flattened tubing away from each other comprises suction means shown in the drawings as the respective opposite suction cups 34 and 35 and hoses 36 and 37. The cups 34 and 35 are positioned adjacent the partially formed bag to be opened and are moveable between a first closed position and an open position illustrated in FIG. 3. When engaged with the respective opposite juxtaposed layers of the tubing and moved to the open position the suction means form the access opening in the bag.

In the embodiment illustrated for forming, foam cushions, the invention includes means for directing predetermined amounts of foam precursors into the partially formed bag 40. As best seen in FIGS. 1 and 3, the means for directing a predetermined amount of foam precursor into the partially formed bag 40 comprises an injection cartridge 41 moveable between an operative first position adjacent the opening 42 in the partially formed bag 40 and a position spaced away from the opening 40. Moving the cartridge 41 to the spaced away position allows the bag 40 to be sealed and removed from the supply of tubing 16 independent of the injection cartridge 41.

In the preferred embodiment of the invention, the apparatus further includes cleaning means shown as the wiping pad 43 located in the path of movement of the cartridge 41 for cleaning foam precursors from the cartridge. Additionally, the wiping pad 43 may be soaked with a cleaning solution fed from the stock bottle 48.

As best illustrated in FIGS. 1 and 3, the injection cartridge is fed foam precursors through the supply hoses 44 which like the cartridge are carried on a support member 45. The support member 45 in turn is carried by an arm 46 which in turn is fixed to a carriage 47. The carriage 47 includes a follower illustrated as the small wheel 50 which rests upon and follows a track 51 mounted on the upper horizontal frame 31. As seen in the drawings, the track 51 has a first lower portion 51a, a raised portion 51b and a second lower portion 51c. As the second reciprocal piston 52 moves the carriage 47 and the follower 50 along the track 51, the follower 50 is raised and lowered depending upon its position with respect to the track 51. When the follower is positioned on the first lower portion 51a of the track 51, the cooperation between the respective elements places the cartridge 41 in the operative position with respect to the opening 42 in the bag 40. As the piston 52 retracts the carriage 47 away from the advancement path, the follower 50 moves to the upper portion 51b of the track 51. As a result, because the arm 46 and the support member 45 both follow the carriage 47, as the arm 46, the first support member 45 and the cartridge 41 will all be lifted upwardly. The upward movement of the cartridge 41 lifts it over the anvil 24. As the piston 52 continues to retract the carriage 47 away from the advancement path, the follower 50 moves to the second lower portion 51c of the track 51. Because the relationships heretofore described among the carriage 47, the support member 45, the arm 46 and the cartridge 41, the cartridge is again lowered and comes into engagement with the wiping pad 43. It will thus be seen that the cooperation between all of the mechanical elements positions the injection cartridge 41 in the most advantageous position with respect to the access opening 42 in the bag 40 during injection of foam precursors thereinto and then also moves the cartridge so that it and the anvil 24 do not interfere with each other during either the foam injection or sealing operations.

In addition to the foregoing, the invention further provides means for simultaneously sealing the opening in partially formed bags while removing bags from the stock supply of bag material. It will be seen by those familiar with bagging operations that because the handling of individual, open, cut bags requires extra and somewhat complicated mechanical handling equipment, the elimination of handling of cut bags during filling and sealing operations makes the method of forming the bags much more efficient than those methods which must handle individual bags.

Additionally, the present invention has a further advantage in that when the bags are being formed from flattened plastic tubing coming from a stock supply, the invention provides a means for simultaneously sealing the top of an opened bag, severing the bag from the stock supply of flattened tubing and sealing the leading end of the next successive portion of flattened tubing advanced from the stock supply. It will be understood by those familiar with the operation of such machinery that the adjective "simultaneous" is not intended to imply microscopically precise timing but rather is used in its ordinary meaning, i.e. to describe events that happen at the same time or mechanical elements which operate at the same time. As used with reference to the present invention, "simultaneous" describes the step in which the bag is sealed and severed and the leading end of the next bag is formed all in a single stroke operation of the preferred embodiment.

The method and means for accomplishing these simultaneous operations are best illustrated in FIG. 3. In a preferred embodiment of the invention, the cutting blade 27 is positioned intermediate of the upper sealing edge 22 and the lower sealing edge 23 of the heat seal member 21. Additionally, the anvil 24 includes a space 28 intermediate of its upper portion 25 and its lower portion 26. The space 28 is a size and shape sufficient to receive the blade 27 therein. As previously described, as the first piston mechanism 30 advances the blade 27 forwardly to the complete severing position, the blade 27 will progress completely through the advancement path and sever the bag. At the same time, the heat seal member 21 will have engaged the anvil 24 above and below the blade. Thus, as the blade severs a partially formed bag from the flattened tubing 16, the engagement of the lower sealing edge 23 of the heat seal member with the lower portion 26 of the anvil 24 seals the bag just formed. Concurrently, the upper sealing edge 22 of the heat seal member 21 engages the upper portion 25 of the anvil 24 and forms a seal across a leading end of the next portion of flattened plastic tubing to be advanced. In this manner, a partially formed and filled bag can be sealed and severed from the stock supply at the very same time that the leading edge of the next bag is being sealed prior to its advancement along the path.

Further to the usefulness of the present invention, in a preferred embodiment the apparatus includes means for selectively varying the predetermined incremental length of plastic tubing advanced from the stock supply and means operative in response to the selected predetermined length of tubing for correlating the amount of foam precursors injected into the tubing. As set forth earlier herein, most bag forming machines are adapted to make or make and fill bags of only a single size. In contrast, by eliminating the need for handling cut bags during filling, the present invention enables various lengths of tubing to be advanced and various resulting sizes of bags and cushions to be formed, all filled with an appropriate amount of foam. Of course, varying the size of the bag would present no added advantage in forming different size cushions unless the amount of foam could likewise be varied. Accordingly, and although an appropriate correlation could be accomplished mechanically, in preferred embodiments of the invention the means for selectively varying the length of plastic tubing and for correlating the amount of foam precursors injected comprise automated means such as a computer or microprocessor or equivalent devices which monitor the length of tubing selected and automatically correlate the amount of foam to be injected to the length of tubing advanced and therefore to the size of the bag and cushion to be produced.

The foregoing embodiments are to be considered illustrative, rather than restrictive of the invention, and those modifications which come within the meaning and range of equivalence of the claims are to be included therein.

That which is claimed is:

1. A method of forming a foam cushion for packaging purposes wherein the foam cushion comprises a closed plastic bag substantially filled with a plastic foam, said method comprising:
   (a) advancing a length of plastic tubing in flattened form along a predetermined path of travel with the leading end of the tubing being sealed to provide a closed leading end;
   (b) cutting a transverse slit through both layers of the flattened tubing substantially parallel to said sealed leading end and across only a medial portion of the tubing with the slit being substantially parallel to and spaced from the closed leading end of the tubing and spaced from the side edges of the tubing to leave uncut portions adjacent the side edges;
   (c) moving the tubing apart adjacent the slit to provide an access opening into the tubing and thereby forming an opened bag defined by the access opening and the sealed leading end;
   (d) directing a foamable composition for a plastic foam into the opened bag so as to fill the bag with plastic foam;
   (e) closing the bag by moving the opposing sides of the bag adjacent the opening into contact with each other and then heat fusing the contacting sides of the bag; and
   (f) severing the uncut portions at opposite sides of the slit to completely separate the bag from the tubing and while sealing the new leading end of the tubing.

2. A method according to claim 1 wherein the step of advancing the tubing comprises selectively varying the length of flattened plastic tubing advanced along the predetermined path of travel and wherein the directing of foamable composition into the open bag comprises correlating the amount of foamable composition being directed to the selected length of tubing advanced to thereby form cushions filled with an appropriate amount of foam.

3. A method according to claim 1 comprising continuously repeating steps (a) to (f) inclusive to form successive foam cushions.

4. A method according to claim 1 wherein the step of heat fusing the contacting sides of the bag comprises forming a series of spaced fused portions in which the intervening nonfused portions provide openings for escapement of gaseous foaming agents from the bag.

5. A method according to claim 1 wherein the step of directing a foamable composition into the bag comprises injecting a predetermined amount of the foamable composition into the opened bag.

6. A method according to claim 1 wherein the directing of foamable composition into the open bag comprises:
    moving injection means adjacent the access opening in the bag;
    injecting a predetermined amount of the foamable composition into the opened bag; and
    cleaning the foamable composition from the injection means following each injection of the foamable composition into the opened bag.

7. A method of forming a foam cushion for packaging purposes wherein the foam cushion comprises a closed plastic bag substantially filled with a plastic foam, said method comprising:
    (a) advancing a length of plastic tubing in flattened form along a predetermined path of travel with the leading end of the tubing being sealed to provide a closed leading end;
    (b) cutting a transverse slit through both layers of the flattened tubing substantially parallel to said sealed leading end and across only a medial portion of the tubing with the slit being substantially parallel to and spaced from the closed leading end of the tubing and spaced from the side edges of the tubing to leave uncut portions adjacent the side edges;
    (c) moving the tubing apart adjacent the slit to provide an access opening into the tubing and thereby forming an opened bag defined by the access opening and the sealed leading end;
    (d) directing a foamable composition for a plastic foam into the opened bag so as to fill the bag with plastic foam; and
    (e) simultaneously;
        (i) closing the bag by moving the opposite sides of the bag adjacent the opening into contact with each other and heat fusing the contacting sides of the bag; while
        (ii) severing the uncut portions at opposite sides of the slit to completely separate the bag from the tubing; and while
        (iii) sealing the new leading end of the tubing.

8. An apparatus for successively forming foam cushions for packaging purposes which cushions comprise closed plastic bags substantially filled with a plastic foam; said apparatus comprising:
    means for advancing a predetermined incremental length of flattened plastic tubing having a sealed leading end from a stock supply along a predetermined path of travel;
    means for cutting a transverse slit through only a medial portion of both layers of the tubing at a location spaced said incremental length from the sealed leading end of the tubing and substantially parallel thereto while leaving uncut portions adjacent the side edges;
    means for moving the tubing apart adjacent the slit to provide an access opening into the tubing to thereby form an opened bag defined by the access opening and the sealed leading end;
    means for directing a foamable composition for a plastic foam into the opened bag so as to fill the bag with a plastic foam;
    means for closing the bag comprising means for moving the opposite sides of the bag adjacent the opening into contact with one another and means for heat fusing the contacting sides of the bag;
    means for severing the uncut portions at opposite sides of the slit to completely separate the formed and filled bag from the tubing; and
    means for sealing the new leading end of the tubing prior to said means advancing another incremental length from the stock supply.

9. An apparatus according to claim 8 further comprising means for selectively varying the predetermined incremental length of flattened plastic tubing advanced along the predetermined path of travel and means operative in response to the selected predetermined length of tubing advanced for correlating the amount of foamable composition directed into the opened bag thereby forming various sized cushions filled with an appropriate amount of foam.

10. An apparatus according to claim 8 wherein said means for moving the tubing apart adjacent the slit comprises movable suction means positioned adjacent the opposite sides of the tubing for applying suction to opposite sides of the tubing for forming the access opening in the bag.

11. An apparatus according to claim 8 wherein said means for directing a foamable composition into the opened bag comprises injection means movable to a position adjacent the access opening of the bag and a position spaced away from the access opening.

12. An apparatus according to claim 11 further comprising cleaning means positioned in the path of movement of said injection means for cleaning excess foamable composition from said injection means.

13. An apparatus according to claim 8 wherein said means for cutting the transverse slit comprises a blade movable between a retracted position and a cutting position.

14. An apparatus according to claim 8 wherein said means for severing the uncut portions of the tubing at opposite sides of the slit comprises a blade movable between a bag severing position and a retracted position.

15. An apparatus according to claim 8 wherein said means for cutting a transverse slit and said means for severing the uncut portions of the flattened plastic tubing comprises:
    a cutting blade positioned adjacent said predetermined path of travel of the flattened plastic tubing and extending generally perpendicular thereto and having a total width greater than the width of the flattened plastic tubing to be cut, and movable between a retracted position, a slitting position and a severing position, said blade including:
        a forwardly extending center portion adjacent centermost portions of said predetermined path of travel and having a width less than the width of the flattened plastic tubing to be slit and movable from said retracted position into and across said predetermined path of travel to said slitting position for cutting a transverse slit through both layers of the flattened plastic tubing while leaving the uncut portions adjacent the sides edges; and lateral severing portions extending along and defining opposite sides of said blade for completely severing the uncut portions of the flattened plastic tubing at opposite sides of the slit and to thereby sever the bag from the remainder of the flattened plastic tubing.

16. An apparatus according to claim 8 wherein said means for heat fusing the bag for closing the same and said means for sealing the new leading end of the tubing prior to the advancing of the next incremental length from the stock supply comprises:

a heat seal member positioned on one side of said predetermined path of travel and perpendicularly movable with respect to said predetermined path of travel between respective retracted and sealing positions and having an upper sealing edge for sealing the leading end of the next successive incremental length of flattened plastic tubing and a lower sealing edge for sealing a bag adjacent the slit; and an anvil positioned in opposing relation to said heat seal member and on the other side of said predetermined path of travel at said sealing position and having respective upper and lower portions for respectively receiving said upper sealing edge and said lower sealing edge thereagainst.

17. An apparatus according to claim 16 wherein said anvil comprises a resilient material for receiving said heat seal member thereagainst and for providing a more complete engagement of said upper and lower sealing edges with said anvil and thereby providing more complete seals in the tubing and in the bag.

18. An apparatus according to claim 17 wherein said lower portion of said anvil comprises an interrupted surface of receiving said lower sealing edge thereagainst thereby providing an interrupted seal across a bag.

19. An apparatus for successively forming foam cushions for packaging purposes which cushions comprise closed plastic bags substantially filled with a plastic foam; said apparatus comprising:

means for advancing a predetermined incremental length of flattened plastic tubing having a sealed leading end from a stock supply along a predetermined path of travel;

means for cutting a transverse slit through only a medial portion of both layers of the tubing at a location spaced said incremental length from the sealed leading end of the tubing and substantially parallel thereto while leaving uncut portion adjacent the side edges;

means for moving the tubing apart adjacent the slit to provide an access opening into the tubing to thereby form an opened bag defined by the access opening and the sealed leading end;

means for directing a foamable composition for a plastic foam into the opened bag so as to fill the bag with a plastic foam; and means for simultaneously;
  (i) heat fusing the opposite sides of the bag adjacent the slit; while
  (ii) severing the uncut portions at opposite sides of the slit to completely separate the formed and filled bag from the tubing; and while
  (iii) sealing the new leading end of the tubing prior to said means advancing another incremental length from the stock supply.

* * * * *